No. 682,273. Patented Sept. 10, 1901.
W. E. PRINDLE.
CAR TRUCK.
(Application filed Oct. 24, 1900.)
(No Model.)
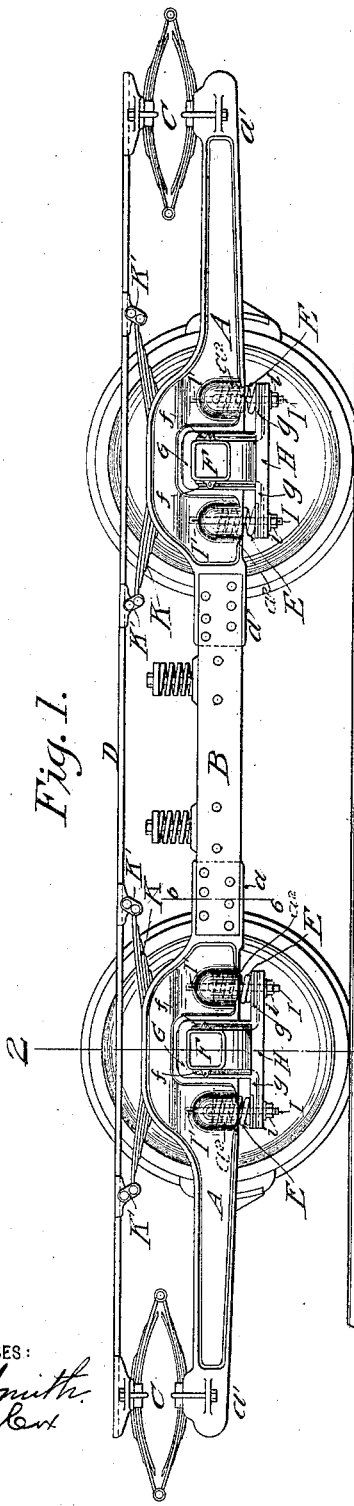
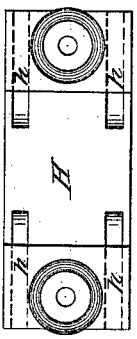
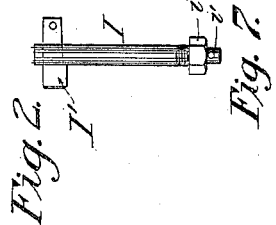
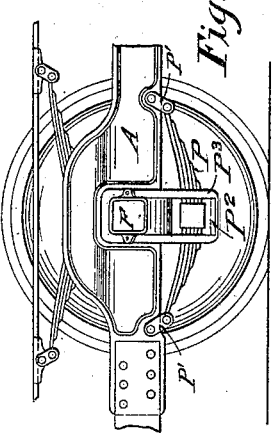
WITNESSES:
B. M. Smith
Bora M. Rent
INVENTOR
W. E. Prindle,
BY Geo. H. Parmelee,
his ATTORNEY.

UNITED STATES PATENT OFFICE.

WILLIAM E. PRINDLE, OF JOHNSTOWN, PENNSYLVANIA, ASSIGNOR TO THE LORAIN STEEL COMPANY, OF PENNSYLVANIA.

CAR-TRUCK.

SPECIFICATION forming part of Letters Patent No. 682,273, dated September 10, 1901.

Application filed October 24, 1900. Serial No. 34,162. (No model.)

*To all whom it may concern:*

Be it known that I, WILLIAM E. PRINDLE, of Johnstown, in the county of Cambria and State of Pennsylvania, have invented a new and useful Improvement in Car-Trucks, of which the following is a full, clear, and exact description, reference being had to the accompanying drawings, which form a part of this specification.

My invention has relation to car-trucks of the class usually known as "single" trucks, and is designed to produce an easy-riding truck of simple and desirable character, adapted for the support of electric motors, and so constructed as to permit the wheels and axles to be readily removed when necessary.

A further object is to provide a truck which can be constructed with different lengths of wheel-base without change in the patterns and frame-castings and which after being assembled can readily have its wheel-base changed, if desired.

With these objects in view my invention consists in the novel construction, arrangement, and combination of parts, all as hereinafter described, and pointed out in the appended claims.

In the accompanying drawings, Figure 1 is a side elevation of a car-truck embodying my invention. Fig. 2 is a section on the line 2 2 of Fig. 1. Figs. 3 and 4 are plan and side views, respectively, of one of the spring-seats for the journal-box springs. Fig. 5 is a detail view of one of the journal-box straps. Fig. 6 is a section on the line 6 6 of Fig. 1. Fig. 7 is a detail view of one of the bolts which support the spring-seats, and Fig. 8 is a detail view showing in side elevation a different arrangement of journal-box springs.

Each of the side frames of my improved truck is formed by two castings A and a double connecting-piece B, by means of which the castings are rigidly joined. Each of the castings A is arched to form a seat in its under side for one of the journal-boxes, with a short extension $a$ at the inner side cored out to form seats for the connecting-pieces B, which are parallel edgewise, disposed bare, fitted to, and securely riveted in, said seats, and a longer outward extension $a'$, which forms a seat for an end elliptic spring C, which supports the overhanging end of the upper member or sill-plate D. The castings A are also cored out to form a pocket $a^2$ at each side of the journal-box seat for a spiral journal-box spring E. The seats for the journal-boxes F are not as deep as the height of the boxes, and the guides for the boxes are formed by U-shaped straps G, which fit over the top portions of the boxes, as best shown in Fig. 2, with their lower end portions $g$ turned outwardly and resting in seats $h$ in pieces H underneath the boxes. There are two of these straps for each box, one in front of and one behind the casting A, as shown in Fig. 2, the box being formed with shoulders or abutments $f$ to prevent displacement of the straps. The pieces H form seats for the journal-box springs E and are supported by means of bolts I, which pass up through the springs and are secured in the castings A by means of through-keys $I'$. These bolts also pass through the end portion $g$ of the straps G and are secured at their lower ends by nuts $i$. These nuts may be secured against displacement by pins $i'$ or other suitable locking devices. The castings A are also recessed at $a^3$ to form seats for the central portions of semi-elliptic springs K, whose ends are connected to the sill-plates D by means of the short links $K'$.

To remove either pair of wheels and axles, all that is necessary is to remove the nuts $i$, thereby releasing the spring-seats H. The truck-frame can then be jacked up and the wheels rolled out, or they may be dropped away from the same into a suitable pit, such as is sometimes provided for the purpose. In case of difficulty in removing the nuts $i$ the keys $I'$ may be driven out and the bolts, springs, and straps all be removed with the wheels and axle.

It will be readily understood that with a standard set of patterns for the pedestal-castings A, the length of which base can be changed to any extent desired by using connecting-pieces B of the proper length and that the wheel-bases of trucks in use can be changed at any time by removing the pieces B and instituting therefor other pieces of a different length. The construction described also enables the use of an extended spring-base without unduly increasing the length of wheel-base.

In the modification shown in Fig. 8 instead of the spiral journal-box springs E, I show a semi-elliptic spring P underneath the journal-box. The ends of this spring are connected to the casting A by means of short links P', and its center-bearing is upon a piece P², supported by rectangular straps P³. Fig. 8 shows but one of these straps; but two of them are employed in the same way as the straps G first described. The links K are removably connected to the casting A to permit the wheels and axles to be readily removed.

I do not wish to limit myself to the exact construction and combination of parts which I have herein shown and described, since various changes in the details may be made without departing from the spirit and scope of my invention.

Having thus described my invention, what I claim, and desire to secure by Letters Patent, is—

1. In a car-truck, a pedestal-casting having a vertical recess in its under side to form a seat for an axle or journal-box, a longitudinal recess at its top portion forming a seat for a car-body-supporting spring, upwardly-extending spring-seating pockets at each side of its vertical recess, and longitudinal extensions both within and without the wheel-base.

2. In a car-truck, the combination with the extended side pieces having journal-box seats, the extended sill-pieces, the elliptic springs seated between the extended ends of said side and sill pieces without the wheel-base, and the semi-elliptic springs having a center bearing on the side pieces over the journal-box guides, and their ends flexibly connected to the sill-pieces.

3. In a car-truck, the combination of the pedestal-pieces having longitudinal extensions both within and without the whole base, the upper extended sill-pieces, the elliptic springs seated between the extensions of the sill-pieces and the outer extensions of the pedestal-pieces, and the semi-elliptic springs having center bearings on said pedestal-pieces and end bearings on said sill-pieces.

4. In a car-truck, the combination with the extended side pieces having journal-box seats, the extended sill-pieces, the elliptic springs seated between the extended ends of said side and sill pieces without the wheel-base, and semi-elliptic springs having a center bearing on the side pieces over the journal-box seats and end bearings on said sill-pieces, together with journal-box springs connected to the said side pieces and having bearings on supports carried by the journal-boxes.

5. In a car-truck, the combination with side frames having seats for journal-boxes, journal-boxes seated therein, spring bearing-pieces underneath the said boxes, guide-straps embracing the said boxes, and springs seated between said pieces and bearings on the frame, and bolts extending through said springs and connecting the straps to said bearing-pieces and also supporting the bearing-pieces from the frames.

6. In a car-truck, the combination with side frames having seats for journal-boxes, journal-boxes seated therein, the parallel guide-straps seated over said boxes, the spring-supports underneath said boxes, and formed with seats for the lower portions of said straps, the springs seated in pockets in the side frames and upon said supports, and bolts which detachably connect said supports to the side frames.

7. In a car-truck, the combination with the side frames having seats for the journal-boxes, and a spring-pocket at the sides of said seats, of the U-shaped guide-straps embracing the axle-box at both the inside and outside of the side frames, and having their lower portions bent horizontally, the spring-supports under the axle-boxes having seats for the horizontal portions of said straps, the springs seated in said pockets and upon said supports, and bolts detachably connecting said supports to the frame.

8. In a car-truck, the combination with spring-supports extending underneath the axle-boxes, the springs seated on said supports and in pockets of the truck-frame, bolts extending up through the end portions of said supports and through the springs and pockets, nuts on the lower ends of said bolts, and detachable laterally-movable fastenings which secure the upper ends of said bolts to the frame.

In testimony whereof I have affixed my signature in presence of two witnesses.

WILLIAM E. PRINDLE.

Witnesses:
BLANCHE M. SMITH,
H. W. SMITH.